United States Patent
Huang

(10) Patent No.: US 6,688,684 B2
(45) Date of Patent: Feb. 10, 2004

(54) SADDLE ASSEMBLY HAVING A CUSHIONING DEVICE

(76) Inventor: Chen Hua Huang, No. 108-24, Chong Chin Road, Bei Tun Chu, Taichung (TW), 406

( * ) Notice: Subject to any disclaimer, the term of this patent is extended or adjusted under 35 U.S.C. 154(b) by 0 days.

(21) Appl. No.: 10/050,521

(22) Filed: Jan. 18, 2002

(65) Prior Publication Data

US 2003/0137169 A1 Jul. 24, 2003

(51) Int. Cl.[7] ............................................... B60N 2/38
(52) U.S. Cl. ..................... 297/195.1; 297/210; 297/214; 297/211
(58) Field of Search .......................... 297/195.1, 217.1, 297/214, 210, 195.12, 195.13, 215.11, 211

(56) References Cited

U.S. PATENT DOCUMENTS

| | | | | |
|---|---|---|---|---|
| 507,514 A | * | 10/1893 | Warwick | 297/204 |
| 987,825 A | * | 3/1911 | Persons | 297/211 |
| 1,546,909 A | * | 7/1925 | Mesinger | 297/210 |
| 1,607,748 A | * | 11/1926 | Renkhoff | 297/211 |
| 1,881,136 A | * | 10/1932 | Schmidt | 297/201 |
| 5,020,851 A | | 6/1991 | Chen | 297/195 |
| 5,855,410 A | * | 1/1999 | Lin | 297/215.15 |
| 6,019,422 A | * | 2/2000 | Taormino et al. | 297/195.1 |
| 6,089,656 A | * | 7/2000 | Hals | 297/215.13 |
| 6,260,918 B1 | * | 7/2001 | Lee | 297/195.1 |
| 6,402,234 B1 | * | 6/2002 | Yu | 297/195.1 |
| 6,443,524 B1 | * | 9/2002 | Yu | 297/209 |

* cited by examiner

Primary Examiner—Peter M. Cuomo
Assistant Examiner—Erika Garrett

(57) ABSTRACT

A saddle device includes a saddle member, and a cushioning device disposed between a seat post and the saddle member for cushioning the saddle member and having two frames. The frames each includes an upper leg secured to the saddle member, a lower leg secured to the seat post, and a bent portion formed between the upper leg and the lower leg. Two gaskets are engaged in the bent portions of the frames for changing the cushioning effects of the frames. The lower legs of the frames may be easily secured onto the typical seat posts without changing the structure of the seat posts.

11 Claims, 5 Drawing Sheets

US 6,688,684 B2

SADDLE ASSEMBLY HAVING A CUSHIONING DEVICE

BACKGROUND OF THE INVENTION

1. Field of the Invention

The present invention relates to a saddle assembly, and more particularly to a saddle assembly having a cushioning device for cushioning the saddle member.

2. Description of the Prior Art

Typical saddles for cycles comprise a saddle member secured on top of a seat post, and one or more spring members attached or secured between the saddle member and the seat post for cushioning purposes. A complicated configuration is required for securing the typical saddle members and the spring members onto the seat posts.

U.S. Pat. No. 5,020,851 to Chen discloses the other saddle devices having a C-shaped support member secured between the saddle member and the seat post for cushioning the saddle member. However, the C-shaped support member is solidly secured on top of the seat post and may not be disengaged from the seat post, such that the C-shaped support member may not be attached to the other seat posts of the other cycles and may not be used to support the other saddle members. The users have to purchase the whole cycle frames in order to have the C-shaped support member disposed and provided on the seat posts of the cycles; i.e., the users may not have the typical saddle members supported or cushioned by the C-shaped support member, unless the whole cycle frame is replaced with the other one that has the C-shaped support member provided thereon.

The present invention has arisen to mitigate and/or obviate the afore-described disadvantages of the conventional saddle assemblies.

SUMMARY OF THE INVENTION

The primary objective of the present invention is to provide a saddle assembly including a cushioning device for cushioning the saddle member, and for allowing the saddle member to be attached onto the typical seat posts of the cycles.

In accordance with one aspect of the invention, there is provided a saddle assembly comprising a seat post including an upper portion, a saddle member, a first cushioning device provided and disposed between the upper portion of the seat post and the saddle member for cushioning the saddle member, the first cushioning device including a pair of frames each having an upper leg secured to the saddle member, a lower leg secured to the seat post, and a bent portion formed between the upper leg and the lower leg, means for securing the upper legs of the frames to the saddle member, and means for fastening the lower legs of the frames to the upper portion of the seat post. The first cushioning device is secured to the saddle member, and the lower legs of the frames may be secured onto the typical seat posts of the cycles, without changing the structure or the configuration of the typical seat posts of the typical cycles.

The fastening means includes a seat provided on the upper portion of the seat post for supporting the lower legs of the frames, and for allowing the saddle member to be easily secured onto the typical seat posts of the cycles.

The fastening means further includes a cap engaged on the lower legs of the frames and secured to the seat for securing the lower legs of the frames on the seat.

The lower legs of the frames each includes a free end, the saddle assembly further includes a coupling bar secured to the free ends of the lower legs of the frames for forming an integral-one-piece to the frames, and for allowing the frames to be manufactured or bent from a wire.

The upper legs of the frames includes a front end secured together with a coupling member. The frames each includes two bent segments formed between the bent portion and the upper and the lower legs respectively, for forming a circular opening in each of the bent portion thereof.

The saddle member includes a bottom portion having a plate secured therein, the plate includes a pair of reinforcing ribs extended therefrom and each having an inclined surface formed therein for engaging with the bent segments of the frames respectively, and for stably retaining the frames to the plate.

The bent portions of the frames each includes an opening formed therein, a second cushioning device is further provided and engaged in the bent portions of the frames and includes two gaskets engaged in the openings of the frames, for changing the cushioning effects of the frames.

The second cushioning device further includes a barrel secured between the gaskets, and means for securing the gaskets to the barrel.

The saddle member includes a bottom portion, the securing means includes a casing provided on the bottom portion of the saddle member and having a chamber formed therein, the upper legs of the frames each includes a front end engaged into the chamber of the casing for allowing the frames to be stably secured to the plate.

The front ends of the upper legs of the frames are secured together with a coupling member, and engaged into the chamber of the casing.

The securing means includes two pairs of posts provided on the bottom portion of the saddle member, the upper legs of the frames are engaged between the pairs of posts respectively.

Two lids are further provided and engaged on the upper legs of the frames and secured to the pairs of posts for securing the upper legs of the frames to the plate with the posts.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
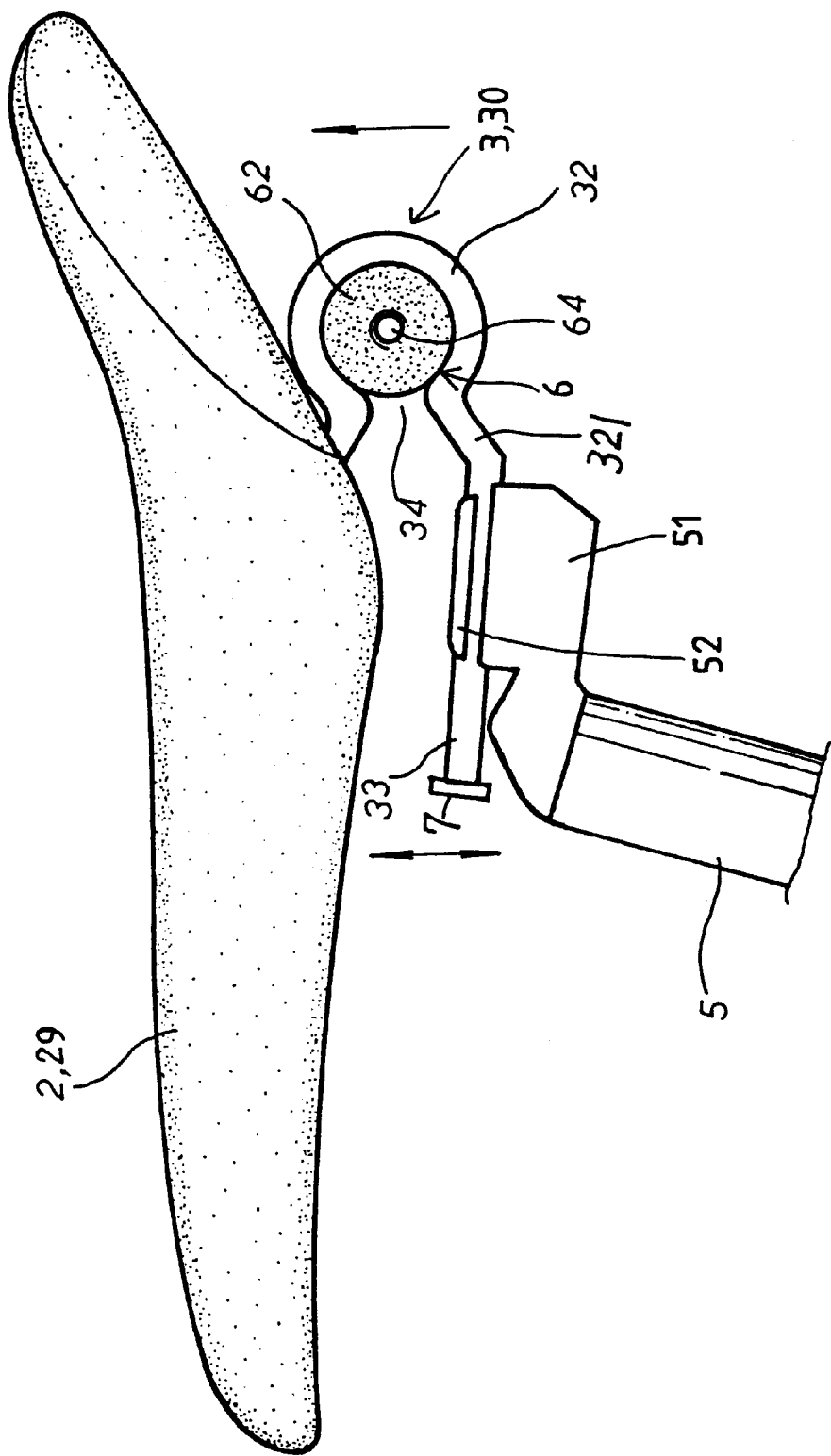
FIG. 1 is a plan schematic view illustrating the attachment of a saddle assembly in accordance with the present invention onto a seat post of a typical cycle.
Figure 2:
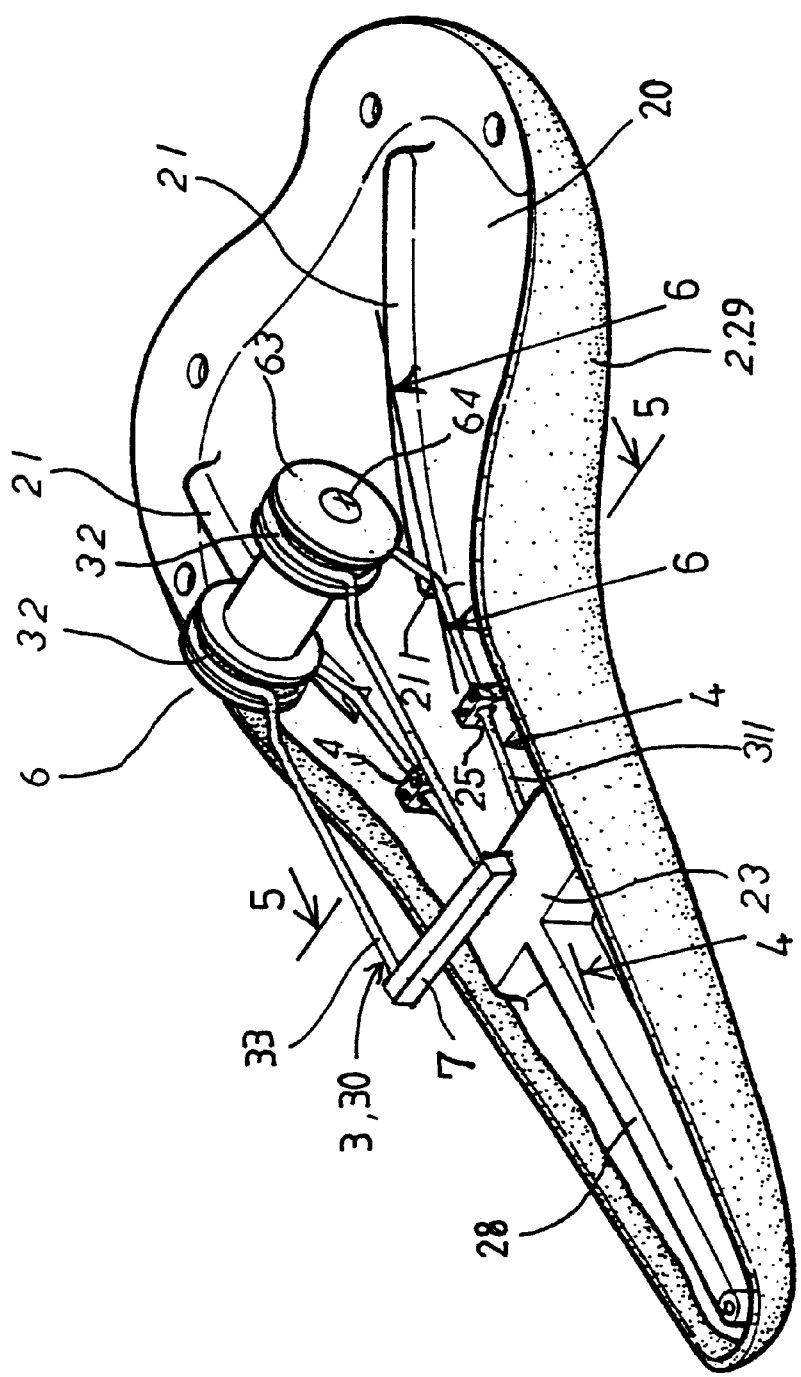
FIG. 2 is a bottom perspective view of the saddle assembly.

Referring to the drawings, and initially to FIGS. 1–6, a saddle assembly in accordance with the present invention comprises a saddle member 2 including a plate 20 provided on the bottom thereof, and including a cushion member 29 disposed or secured or attached on top of the plate 20. The plate 20 includes a hardness greater than that of the cushioning member 29 for stably attaching the saddle member 2 onto a seat post 5 (FIGS. 1, 7) of the typical cycle. The typical seat post 5 includes a bracket or a seat 51 secured on top thereof, and/or a cap 52 secured on top of the seat 51 for securing the typical saddle members onto the seat post 5. The seat 51 and the cap 52 are typical and are provided on the typical cycles.

Figure 3:
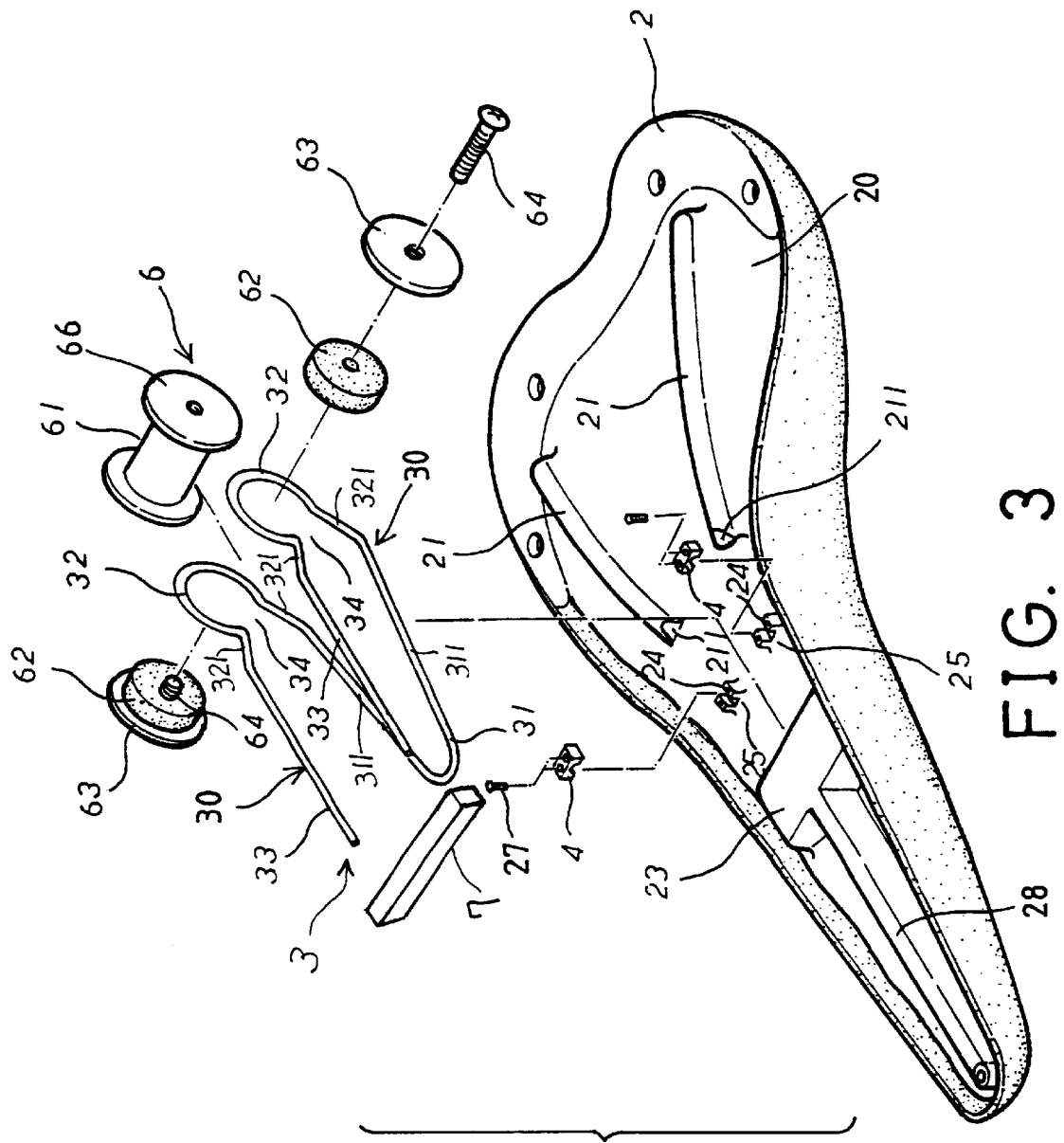
FIG. 3 is an exploded view as seen from the bottom of the saddle assembly.
Figure 4:
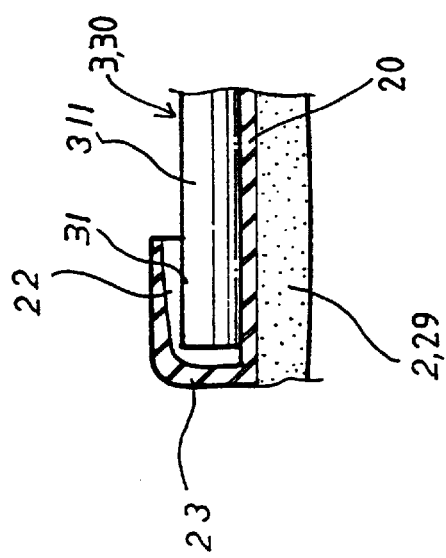
FIGS. 4, 5, 6 are partial cross sectional views taken along lines 4—4, 5—5, 6—6 of FIG. 2 respectively.
Figure 5:
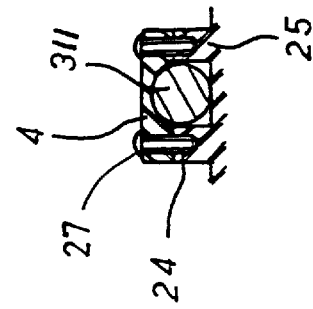
Figure 6:
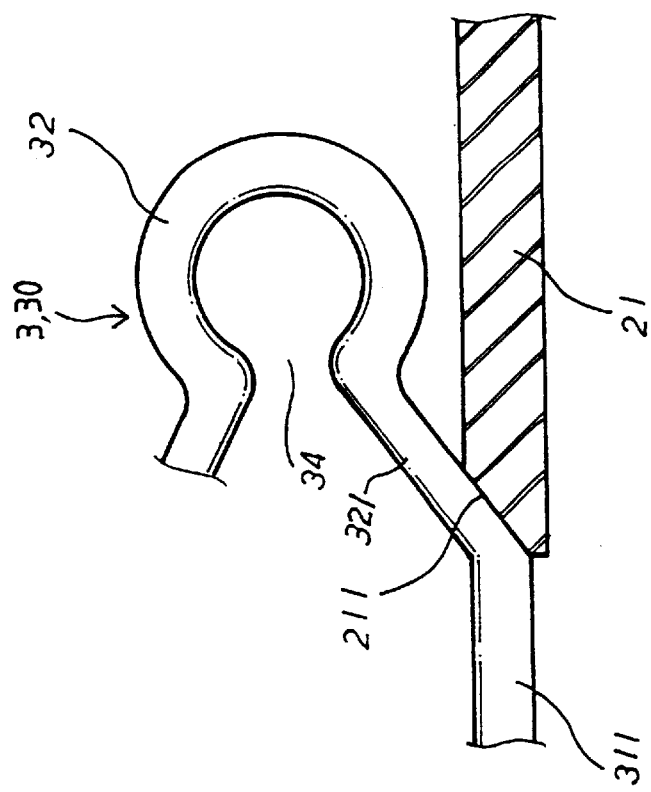

The plate 20 includes one or more reinforcing ribs 21, 28 extended or formed thereon, and includes a casing 23 formed in the front or in the middle portion thereof and having a chamber 22 formed therein, and preferably facing rearward. Two of the reinforcing ribs 21 each includes one end facing toward the casing 23 and each having an inclined surface 211 (FIGS. 2, 3, 6) formed therein. The plates 20 further includes two pairs of posts 25 extended therefrom and located between the ribs 21 and the casing 23, and each having a screw hole 24 formed therein for receiving or for threading with fasteners 27 (FIGS. 3, 5).

A cushioning device 3 is to be secured between the saddle member 2 and the seat post 5 for cushioning the saddle member 2, and includes a pair of frames 30 that are substantially parallel to each other. The frames 30 each includes an upper leg 311 engaged onto the plate 20 and engaged between the pairs of posts 25 (FIG. 5). Two lids 4 are engaged onto the upper legs 311 of the frames 30 respectively and secured to the posts 25 with the fasteners 27, for securing the upper legs 311 of the frames 30 to the plate 20 (FIG. 5). The frames 30 each further includes a lower leg 33, a bent portion 32 formed or provided between the upper leg 311 and the lower leg 33, and two bent segments 321 formed and provided between the bent portion 32 and the respective upper and lower legs 311, 33, and for forming a circular opening 34 formed in the respective bent portion 32 of the frames 30.

Figure 7:
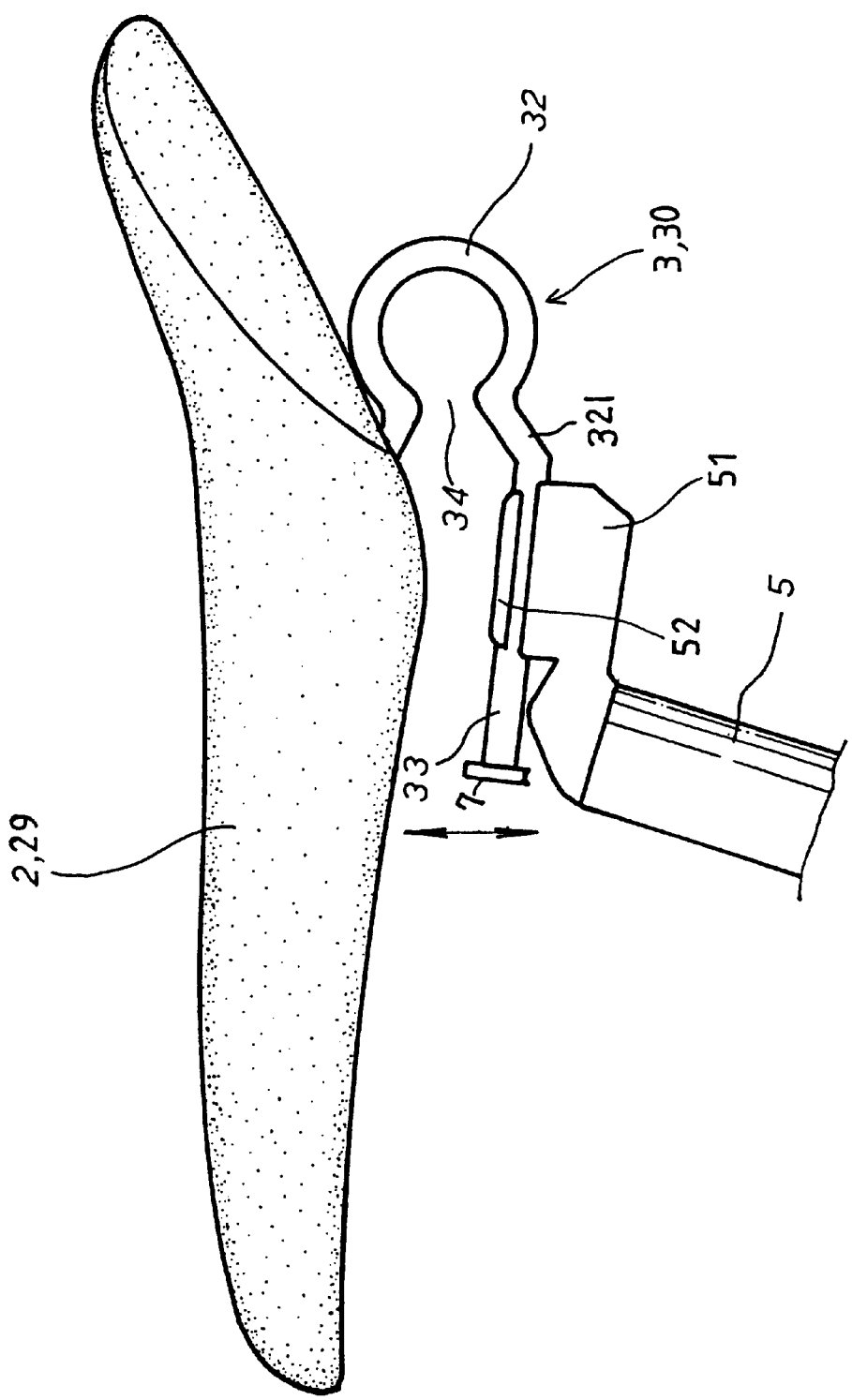
FIG. 7 is a plan schematic view similar to FIG. 1, illustrating the operation of the saddle assembly.

The upper legs 311 of the frames 30 preferably include one end, particularly the front end secured together with a coupling member 31, such that the frames 30 may be formed as an integral-one-piece structure and may be formed or manufactured or bent from a wire. The front ends or the coupling member 31 of the frames 30 is engaged and retained in the chamber 22 of the casing 23, best shown in FIG. 4. The bent segments 321 of the frames 30 are engaged with the inclined surface 211 of the ribs 21 (FIG. 6), such that the upper legs 311 of the frames 30 may be stably and solidly secured to the plate 20. The lower legs 33 of the frames 30 may be secured to the seat 51 of the typical seat post 5 with the typical cap 52 (FIGS. 1, 7). A coupling bar 7 may further be provided and secured to the free ends or the front ends of the lower legs 33 of the frames 30, for forming a stable structure to the frames 30.

In operation, as shown in FIG. 7, the cushioning device 3 may thus be secured between the saddle member 2 and the seat post 5 for forming an excellent cushioning structure to cushion the saddle member 2. In addition, the lower legs 33 of the frames 30 may be attached onto the seat posts 5 of the typical cycles without changing or modifying the configuration of the seat posts 5.

Referring again to FIGS. 1–3, another cushioning device 6 is further provided and includes two pads or gaskets 62 engaged in the openings 34 of the frames 30 respectively, a barrel 61 disposed or engaged between the gaskets 62, and two washers or panels 63 engaged onto the outer portions of the gaskets 62. One or more fasteners 64 may engage through the panels 63 and the gaskets 62 and the barrel 61 for securing the gaskets 62 to the barrel 61, and for positioning or retaining the gaskets 62 in the openings 34 of the frames 30 respectively. For example, the barrel 61 may include two ends each having an enlarged wall 66 provided thereon for engaging with the gaskets 62, and for allowing the gaskets 62 to be stably retained and positioned between the walls 66 of the barrel 61 and the panels 63.

In operation, as shown in FIG. 1, the gaskets 62 may thus be selectively engaged into the openings 34 of the frames 30 respectively, for changing the cushioning effect of the frames 30. For example, the engagement of the gaskets 62 in the openings 34 of the frames 30 may increase the stiffness or the strength of the frames 30 and may decrease the resilience of the frames 30.

Accordingly, the saddle assembly in accordance with the present invention includes a cushioning device for cushioning the saddle member, and for allowing the saddle member to be attached onto the typical seat posts of the cycles. The saddle member may thus be easily secured onto the typical seat posts of the typical cycles with the typical seats and caps without changing the configuration of the typical seat posts.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saddle assembly comprising:
   a) a seat post including an upper portion having a seat provided thereon,
   b) a saddle member including a bottom portion,
   c) a first cushioning device provided and disposed between said upper portion of said seat post and said saddle member for cushioning said saddle member, said first cushioning device including a pair of frames having:
      i) two upper legs secured to said saddle member,
      ii) two lower legs disposed and supported on said seat of said seat post, for securing to said seat post, and
      iii) two bent portions formed between said upper legs and said lower legs respectively,
   d) means for securing said upper legs of said frames to said saddle member, said securing means including two pairs of posts provided on said bottom portion of said saddle member, said upper legs of said frames are engaged between said pairs of posts respectively, and
   e) a cap engaged onto said lower legs of said frames and secured onto said seat, to fasten said lower legs of said frames to said seat and to said upper portion of said seat post.

2. The saddle assembly according to claim 1, wherein said lower legs of said frames each includes a free end, said saddle assembly further includes a coupling bar secured to said free ends of said lower legs of said frames.

3. The saddle assembly according to claim 1, wherein said upper legs of said frames include a front end secured together with a coupling member.

4. The saddle assembly according to claim 1, wherein said frames each includes two bent segments formed between said bent portion and said upper and said lower legs respectively, for forming a circular opening in each of said bent portion thereof.

5. A saddle assembly comprising:
   a) a seat post including an upper portion having a seat provided thereon, b) a saddle member, c) a first cushioning device provided and disposed between said upper portion of said seat post and said saddle member for cushioning said saddle member, said first cushioning device including a pair of frames having:

i) two upper legs secured to said saddle member,
  ii) two lower legs disposed and supported on said seat of said seat post, for securing to said seat post, and
  iii) two bent portions formed between said upper legs and said lower legs respectively.

d) means for securing said upper legs of said frames to said saddle member, and e) a cap engaged onto said lower legs of said frames and secured onto said seat, to fasten said lower legs of said frames to said seat and to said upper portion of said seat post, said saddle member including a bottom portion having a plate secured therein, said plate including a pair of reinforcing ribs extended therefrom and each having an inclined surface formed therein for engaging with said bent segments of said frames respectively.

6. The saddle assembly according to claim 1 further comprising a second cushioning device engaged in said bent portions of said frames.

7. A saddle assembly comprising:

a) a seat post including an upper portion having a seat provided thereon, b) a saddle member, c) a first cushioning device provided and disposed between said upper portion of said seat post and said saddle member for cushioning said saddle member, said first cushioning device including a pair of frames having:

i) two upper legs secured to said saddle member,
  ii) two lower legs disposed and supported on said seat of said seat post, for securing to said seat post, and
  iii) two bent portions formed between said upper legs and said lower legs respectively, d) means for securing said upper legs of said frames to said saddle member, and e) a cap engaged onto said lower legs of said frames and secured onto said seat, to fasten said lower legs of said frames to said seat and to said upper portion of said seat post, said bent portions of said frames each including an opening formed therein, said second cushioning device including two gaskets engaged in said openings of said frames.

8. The saddle assembly according to claims 7, wherein said second cushioning device further includes a barrel secured between said gaskets, and means for securing said gaskets to said barrel.

9. The saddle assembly according to claim 1, wherein said saddle member includes a bottom portion, said securing means includes a casing provided on said bottom portion of said saddle member and having a chamber formed therein, said upper legs of said frames each includes a front end engaged into said chamber of said casing.

10. The saddle assembly according to claim 9, wherein said front ends of said upper legs of said frames are secured together with a coupling member, and engaged into said chamber of said casing.

11. The saddle assembly according claim 1 further comprising two lids engaged on said upper legs of said frames and secured to said pairs of posts for securing said upper legs of said frames to said plate with said posts.

\* \* \* \* \*